United States Patent
Swope et al.

(10) Patent No.: US 6,636,591 B1
(45) Date of Patent: Oct. 21, 2003

(54) SYSTEM AND METHOD FOR AFFECTING INMATE CONDUCT WITH GOOD BEHAVIOR DISCOUNT TELEPHONE RATES

(75) Inventors: Bobb Swope, Coppell, TX (US); Donald B. Vaello, San Antonio, TX (US)

(73) Assignee: Evercom Systems, Inc., Irving, TX (US)

(*) Notice: Subject to any disclaimer, the term of this patent is extended or adjusted under 35 U.S.C. 154(b) by 62 days.

(21) Appl. No.: 09/640,999

(22) Filed: Aug. 17, 2000

(51) Int. Cl.[7] .............................................. H04M 15/00
(52) U.S. Cl. ........................ 379/114.12; 379/114.01; 379/114.1; 379/114.15; 379/121.02
(58) Field of Search ........................ 379/111, 112.01, 379/114.01, 114.03, 114.1, 114.12, 114.13, 114.14, 114.15, 114.17, 114.2, 114.21, 114.23, 121.01, 121.02

(56) References Cited

U.S. PATENT DOCUMENTS

| | | | |
|---|---|---|---|
| 5,359,642 A | | 10/1994 | Castro |
| 5,485,507 A | | 1/1996 | Brown et al. |
| 5,646,839 A | * | 7/1997 | Katz .................. 379/93.01 |
| 5,655,013 A | | 8/1997 | Gainsboro |
| 5,926,533 A | | 7/1999 | Gainsboro |
| 5,991,376 A | * | 11/1999 | Hennessey et al. .... 379/114.01 |
| 6,054,928 A | * | 4/2000 | Lemelson et al. ....... 340/573.4 |
| 6,072,860 A | * | 6/2000 | Kek et al. ................. 379/88.25 |
| 6,173,046 B1 | * | 1/2001 | Jagadish et al. ............. 379/111 |
| 6,222,914 B1 | * | 4/2001 | McMullin .............. 379/144.01 |
| 6,327,573 B1 | * | 12/2001 | Walker et al. ................ 705/14 |
| 6,543,686 B1 | * | 4/2003 | Ritter ........................ 235/380 |

FOREIGN PATENT DOCUMENTS

| | | |
|---|---|---|
| GB | 2308474 A | 6/1997 |
| WO | WO 99/18708 | 4/1999 |
| WO | WO 00/52610 | 9/2000 |

OTHER PUBLICATIONS

International Search Report issued Sep. 9, 2002 PCT/US 01/41756.

* cited by examiner

Primary Examiner—Sinh Tran
Assistant Examiner—Quoc Tran
(74) Attorney, Agent, or Firm—Fulbright & Jaworski L.L.P.

(57) ABSTRACT

The present invention is a system and method of affecting inmate behavior within a correctional facility through providing discount telephone calling rates to inmates who qualify for the discounted rates based on predetermined criteria, such as inmate good behavior. The method of the present invention comprises the steps of providing an identification for each inmate, establishing qualifying criteria for a discount telephone rate, and reducing the telephone call charge rate for inmates that meet the qualifying criteria.

10 Claims, 1 Drawing Sheet

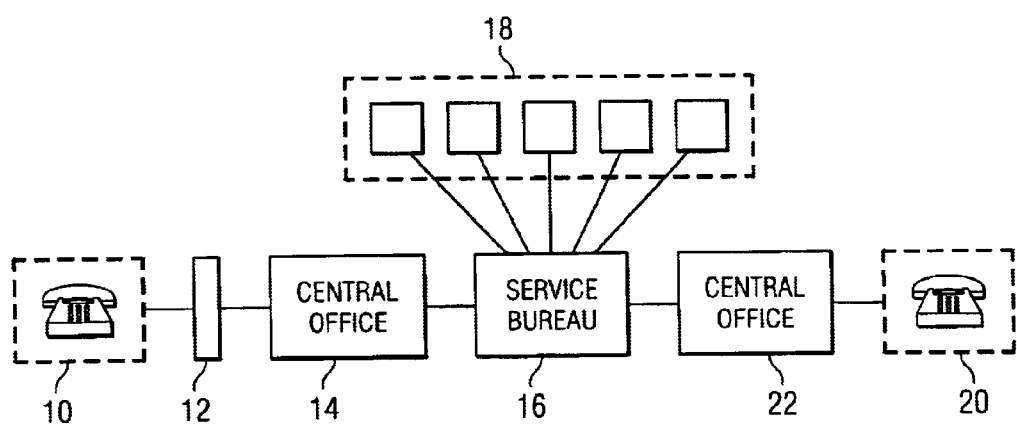

SYSTEM AND METHOD FOR AFFECTING INMATE CONDUCT WITH GOOD BEHAVIOR DISCOUNT TELEPHONE RATES

TECHNICAL FIELD

The present invention generally relates to institutional telephone systems and more particularly to methods of affecting inmate conduct through providing discounted telephone rates based on certain criteria, such as inmate good behavior.

BACKGROUND OF THE INVENTION

Most correctional facilities typically provide some type of telephone system that inmates can access to place calls to people outside of the correctional facility, such as friends and family. Regular contact with family is one of the key elements that can impact inmate conduct during incarceration and decrease the rate of recidivism. Most of these telephone systems allow inmates to place calls via conventional collect calling methods or debit-based calling methods that utilize pre-paid calling cards. The telephone rates for these types of calls are typically higher than normal public call rates.

There currently exists a growing awareness and dissatisfaction with the calling rates associated with telephone calls placed or received by inmates within correctional facilities. Most of the time, these calls are paid for by the family and/or friends of the inmate. Family members face a certain lack of control over the total amount of charges that an inmate can generate through standard collect calling methods when an inmate calls home due to the difficulty in refusing a collect telephone call from a loved one. Furthermore, when charges are in excess of what the family had planned and exceed what their budget can support, the charges can not be paid. This results in a loss of telephone contact with the inmate until past due charges can be settled.

Thus, there is a need to provide discounted rates for inmate telephone calls, which would promote regular contact with family members and, in turn, impact inmate conduct during incarceration. There is presently no known system or method that ties telephone contact with motivation by family members to encourage or promote good behavior on the part of inmates.

SUMMARY OF THE INVENTION

The present invention is a system and method of affecting inmate behavior within a correctional facility through providing discount telephone calling rates to inmates who qualify for the discounted rates based on predetermined criteria, such as inmate good behavior. The method of the present invention comprises the steps of providing an identification for each inmate, establishing qualifying criteria for a discount telephone rate, and reducing the telephone call charge rate for inmates that meet the qualifying criteria.

In a specific embodiment of the present invention, an inmate is identified by a Customer Identification Verification (CIV), such as a Personal Identification Number (PIN), a number associated with a calling card, such as a prepaid calling card, or some other data used for identification purposes. Predetermined qualifying criteria for the reduced rate is established by the institution or correctional facility. Data based on the predetermined qualifying criteria and actual measurements of the inmate's behavior is stored in a database either associated with a telephone system of the facility or independently managed by a remote site provider or service bureau. When the actual measurements meet or exceed the predetermined qualifying criteria for a given period of time, the inmate's PIN number becomes associated with a discounted calling rate within the telephone system. Alternatively, specific destination telephone numbers provided by the inmate can be associated with the discounted rate, thereby eliminating the need to associate the rate with the PIN number. The calling rate remains at a given standard rate for inmates that do not meet or exceed the predetermined qualifying criteria for the given period of time. Thus, the PIN number for these inmates is associated with the standard calling rate within the telephone system. If the behavior measurement data changes for an inmate such that they no longer qualify for the discounted rate, the rate associated with the inmate's PIN number changes to the standard rate and the inmate must "re-qualify" for the discounted rate.

BRIEF DESCRIPTION OF THE DRAWING

FIG. 1 is a schematic diagram of an embodiment of the present invention.

DETAILED DESCRIPTION OF THE PREFERRED EMBODIMENT

While the present invention will be described fully hereinafter with reference to the accompanying drawing, in which a particular embodiment is shown, it is to be understood at the outset that persons skilled in the art may modify the invention herein described while still achieving the desired result of this invention. Accordingly, the description which follows is to be understood as a broad informative disclosure directed to persons skilled in the appropriate arts and not as limitations of the present invention.

The present invention is a system and method of affecting inmate behavior within a correctional facility through providing discount telephone calling rates to inmates who qualify for the discounted rates based on predetermined criteria, such as criteria relating to inmate good behavior. The predetermined criteria may be based on any type of measurement of behavior and can be quantified in a subjective "approved/denied" status-type system or a more objective point-based system wherein a prisoner must have a requisite point total to qualify for the discounted rate. In this type of system, points can be awarded or deducted based on particular behavior of the inmate. The system may also require the inmate to maintain the predetermined criteria for a given time period before the inmate can be eligible for a discounted telephone rate. Predetermined qualifying criteria for the reduced rate is established by the institution or correctional facility. When an inmate receives a reduced rate for his or her telephone calls based on good behavior, the inmate will have an incentive to maintain his or her good behavior.

A correctional facility having a premises-based telecommunications system or a telecommunications provider may provide various methods for an inmate to place a collect call. For example, the provider can issue a prepaid reverse-billing account that can be purchased by anyone wishing to receive calls from an inmate. Additionally, other methods of payment, such as credit card, debit card, or prepaid calling card can be utilized by the inmate. Each inmate is provided identification through the use of a Customer Identification Verification (CIV), such as a Personal Identification Number (PIN). The identification allows the correctional facility to track and maintain records on the behavior of each inmate.

FIG. 1 depicts an embodiment of the present invention as implemented in connection with a correctional facility or other institution having at least one originating telephone 10 connected to a premises-based telecommunications system 12. However, it is to be understood that this embodiment could be utilized in connection with any location having a premises-based telecommunications system. An inmate initiates a telephone call from the originating telephone 10 to a called party as a typical collect call by dialing a predetermined access number, such as a "0" (or a "1" and an "800" number), and then a 10-digit destination number. The call is received at a central office 14 of a typical telecommunications system network, such as the PSTN, and routed to a service bureau 16, which is the location associated with the access number. The service bureau 16 includes the necessary equipment to facilitate the method of the present invention, including a processor (not shown) that can link to one or more databases 18 and a collection and detection device (not shown), such as a DTMF collection and detection device, for receiving data entered or provided by the inmate. Alternatively, the equipment can be premises-based, i.e., within the correctional facility. In either case, the inmate is required to provide a CIV, such as a PIN number. Each inmate within the facility is identified by a CIV. Alternatively, other CIVs could be utilized, such as voice recognition, or automated biometric reading techniques, such as "Iris Scanning," finger or palm imaging, or the like.

The processor can prompt the prisoner for a destination number, or, alternatively, the system can be designed so that the destination number is entered when the access number is dialed. The processor utilizes the collection and detection device to collect the entry of the destination number and the CIV of the inmate. The processor contacts a database containing data based on predetermined qualifying criteria and actual measurements of each inmate's behavior. The processor may optionally contact other databases and pass a protocol data message to the databases. This data may include the Automatic Number Identification (ANI), the type and location of the telephone 10, and the destination number. The databases may be used for determining authorization of the destination number.

The processor at the service bureau (or at the institution in a premises-based system) connects to one or more of the databases 18 to determine the rate associated with the CIV of the inmate. Alternatively, if the inmate qualifies for the discounted rate, the discounted rate may be associated with one or more predetermined destination numbers provided by the inmate. A database would then associate the discounted rate with the predetermined destination numbers if the inmate qualifies for the discounted rate. In this alternative embodiment, an inmate would merely dial the destination number. The processor would then determine if the destination number matches one of the predetermined numbers provided by the inmate. This particular embodiment would limit discounted rates only to the predetermined destination numbers.

The call is then completed at the given telephone rate to a destination telephone 20 associated with the destination number through a central office 22 that is associated with the telephone 20. A record, such as an AMA, is established by the processor indicating various call data, such as the total cost of the call, the rate charged, etc. The rate reductions are determined by agreement between the correctional facility and the telecommunications service provider for the facility.

In a preferred embodiment, the correctional facility provides the measurement data for each of the inmates. When the actual measurements meet or exceed the predetermined qualifying criteria for a given period of time (qualifying period), the inmate's CIV, such as a PIN number, is associated with a discounted calling rate within the database. The calling rate remains at a given standard rate for inmates that do not meet or exceed the predetermined qualifying criteria for the given period of time. Thus, the CIV, such as a PIN number, for these inmates is associated with the standard calling rate within the database of the telephone system. If the behavior measurement data changes for an inmate such that they no longer qualify for the discounted rate, the rate associated with the inmate's PIN number changes to the standard rate and the inmate must "re-qualify" for the discounted rate and again maintain qualification for the qualifying period.

The method is particularly useful to the corrections industry for use with inmates who frequently call their friends, family, loved ones, etc. The costs of these calls are typically borne by the family. Since the inmate can potentially qualify for lower telephone rates through good behavior, the friends and family of the inmate will most likely "pressure" the inmate to continue his or her good behavior so that they can benefit from the reduced rates.

While the specific embodiments have been illustrated and described, numerous modifications come to mind without significantly departing from the spirit of the invention and the scope of protection is only limited by the scope of the accompanying claims.

What is claimed is:

1. A method of affecting inmate behavior within a correctional facility comprising the steps of:

providing an identification for each inmate;

establishing a discount telephone rate;

establishing a measurement of conduct during incarceration for the inmates, wherein
   said measurement is a predetermined point total;

reducing the telephone call charge rate for inmates that meet the measurement of conduct during incarceration for a predetermined period of time;

maintaining a record of inmate behavior for each inmate according to said identification;

awarding points to each inmate based on particular behavior; and deducting points from each inmate based on particular behavior.

2. The method according to claim 1, further including the step of raising the rate when an inmate no longer meets the measurement of conduct during incarceration.

3. The method according to claim 1 further comprising:

connecting to a database to determine whether an inmate is qualified to receive the reduced charge rate.

4. The method according to claim 1 wherein said reduced charge rate is a rate for a collect call.

5. The method according to claim 1, wherein the identification is a respective PIN number assigned to each inmate for placing collect calls.

6. The method according to claim 1, wherein the identification is a respective number associated with a prepaid calling card.

7. The method according to claim 1, wherein the identification is effected through voice recognition.

8. The method according to claim 1, wherein the identification is effected through biometric reading techniques.

9. A method of affecting inmate behavior within a correction facility comprising the steps of:

establishing a discount telephone rate;

establishing a measurement of conduct during incarceration for the inmates, wherein
said measurement is a predetermined point total;
reducing the telephone call charge rate for inmates that meet the measurement of conduct during incarceration for a predetermined period of time;
associating the reduced charge rate with at least one predetermined destination number;
maintaining records of inmate behavior for each inmate according to an inmate identifier;
awarding points to inmates based on particular behavior; and
deducting points from inmates based on particular behavior.

10. The method according to claim 9 further comprising:
connecting to a database to determine whether an inmate is qualified to receive the reduced charge rate for said at least one predetermined destination number.

* * * * *